(12) United States Patent
Wang (10) Patent No.: US 11,808,291 B2
(45) Date of Patent: Nov. 7, 2023

(54) SOFA FRAME, SOFA FRAME VERTICAL SUPPORT BAR AND ASSEMBLED SOFA

(71) Applicant: Chang You Wang, Dongguan (CN)

(72) Inventor: Chang You Wang, Dongguan (CN)

( * ) Notice: Subject to any disclaimer, the term of this patent is extended or adjusted under 35 U.S.C. 154(b) by 0 days.

(21) Appl. No.: 17/741,480

(22) Filed: May 11, 2022

(65) Prior Publication Data

US 2023/0235768 A1 Jul. 27, 2023

(30) Foreign Application Priority Data

Jan. 24, 2022 (CN) .......................... 202220196302.0

(51) Int. Cl.
*F16B 12/10* (2006.01)
*A47C 7/02* (2006.01)

(52) U.S. Cl.
CPC ................ *F16B 12/10* (2013.01); *A47C 7/02* (2013.01); *F16B 2012/106* (2013.01)

(58) Field of Classification Search
CPC ..... F16B 12/10; F16B 2012/106; A47C 17/02
USPC .......................................................... 297/74
See application file for complete search history.

(56) References Cited

U.S. PATENT DOCUMENTS

2012/0212021 A1* 8/2012 Hunter ................... A47C 4/028
53/399
2022/0053941 A1* 2/2022 Chen ..................... A47C 19/005

FOREIGN PATENT DOCUMENTS

CN          212099263    * 12/2020

* cited by examiner

*Primary Examiner* — Mark R Wendell (57) ABSTRACT

A sofa frame, a vertical support bar and an assembled sofa. The sofa frame includes two side boards, a face board connected between the front ends of the two side boards and a back board connected between the rear ends of the two side boards. The two side boards, the face board and the back board forms a detachable frame structure. Between the face board and the back board, a vertical support bar is connected. The rear side of the vertical support bar is fixed with a connecting piece. By fixing and connecting the connecting piece and the back board, the support of the back board is strengthened. The lower end of the vertical support bar is connected with a support leg to contact the ground. The sofa frame is a detachable structure, which can be disassembled for packaging and transportation, and assembled again later.

10 Claims, 7 Drawing Sheets

SOFA FRAME, SOFA FRAME VERTICAL SUPPORT BAR AND ASSEMBLED SOFA

BACKGROUND OF INVENTION

1. Field of the Invention

The present invention relates generally to the furniture field, and more particularly to a sofa, frame, a sofa frame vertical support bar and an assembled sofa.

2. Description of Related Art

Sofas are a kind of furniture widely equipped in homes, offices and public areas. The conventional sofas are big in size and difficult in transportation. In view of this, furniture manufacturers developed a kind of assembled sofas to overcome the problem of transportation. The sofa is divided into multiple parts, which can be neatly packed and easily delivered. When the user receives the product, the user can assemble the parts into a complete sofa by referring to the assembly manual.

However, this kind of sofas has a shortcoming: the assembled sofa has an unstable frame structure, and there is a risk of falling-apart. Particularly, the back board of the frame structure may break easily to fall off from the frame. There is indeed a necessity to improve the product.

SUMMARY OF THE INVENTION

The purpose of the utility model is to overcome the shortcomings of the prior art and provide a sofa support, a longitudinal support rod and an assembled sofa.

In order to solve the above technical problems, the present invention adopts the following first technical solution:

A sofa frame, including two side boards, a face board connected between the front ends of the two side boards and a back board connected between the rear ends of the two side boards, the two side boards, the face board and the back board form a detachable frame structure, characterized in that: between the face board and back board, a vertical support bar is connected, the rear end of the vertical support bar is fixed with a connecting piece that extends upward or downward, by fixing and connecting the connecting piece and the back board, the support of the back board can be strengthened, the lower end of the vertical support bar is configured with at least one support leg to contact the ground.

More particularly, wherein the connecting piece and vertical support bar are fixed integrally to form an L-shaped structure; the connecting piece is fixed on the upper end of the rear side of the vertical support bar, so that the upper end of the vertical support bar forms a support surface, the lower end face of the back board is further supported on the support surface.

More particularly, wherein the are two vertical support bars, symmetrically arranged side by side; the upper end of the support leg is fixed with a U-shaped lock seat, the U-shaped lock seat tightly clamps the two vertical support bars, and they are locked together through a fastening component.

More particularly, wherein the is a storage unit between the vertical support bar and the side board; the storage unit includes: a storage body and a transverse support bar connected to the storage body and supporting the storage body; the storage body is located between the face board, the vertical support bar, the back board, and the side board; one end of the transverse support bar is detachably connected to the vertical support bar, whereas the other end is detachably connected to the side board.

More particularly, the storage body is a folding structure, and the storage body is configured with a detachable base board, and the storage body is pushed open by the base board, so that the inside of the storage body forms a storage chamber.

More particularly, the outer side of the vertical support bar is fixed with a first socket component, the inner side of the side board is fixed with a second socket component; the two ends of the transverse support bar are respectively fixed with a first plug component and a second plug component, and the first plug component and the second plug component are respectively inserted into the first socket component and the second socket component, so that the vertical support bar, the transverse support bar and the side board are fastened together, to form a detachably connected structure; or, both ends of the transverse support bar are integrally fixed with a connecting board, the connecting board is configured with a hole; the two connecting boards are respectively connected to the vertical support bar and the side board, and screws go through the holes of the connecting board to spirally lock it with the vertical support bar and the side board, so that the vertical support bar, the transverse support bar and the side board are fastened together to form a detachably connected structure; or, the two ends of the transverse support bar are configured with threaded sections, and through the threaded sections, and the threaded holes configured on the vertical support bar and the side board, they can be spirally fixed together to form a detachably connected structure.

More particularly, wherein the face board includes at least two boards, two neighboring boards are connected through articulation pieces, so that the two neighboring boards can be folded through the articulation pieces; the front end of the vertical support bar is fixed with a fastening board, the fastening board locks up the two neighboring boards through screws to form a detachable structure.

More particularly, wherein the end part of the face board is configured with a right-angle connecting piece, one side of the right-angle connecting piece is configured with an L-shaped quick disassembly lock hole; the inner side of the side board is configured with a fastening bolt, the right-angle connecting piece is sleeved on the fastening bolt through an L-shaped quick disassembly lock hole, the fastening bolt is tightened to fix the right-angle connecting piece on the inner side of the side board.

In order to solve the above technical problems, the present invention adopts the following second technical solution:

A vertical support bar, the rear side of the vertical support bar being fixed with a connecting piece that extends upward, the connecting piece and the back board being fixed and connected to strengthen the support of the back board, and the lower end of the vertical support bar being configured with at least one support leg to contact the ground.

More particularly, the connecting piece and the vertical support bar are fixed integrally to form an L-shaped structure; the connecting piece is fixed on the upper end of the rear side of the vertical support bar, so that the upper end of the vertical support bar forms a support surface, the lower end face of the back board is further supported on the support surface.

More particularly, wherein the are two vertical support bars, symmetrically arranged side by side; the upper end of the support leg is fixed with a U-shaped lock seat, the U-shaped lock seat tightly clamps the two vertical support bars, and they are locked together through a fastening component.

More particularly, a back cushion and a seat cushion as defined in Claim 1; there is a storage unit between the vertical support bar and the side board; the storage unit includes: a storage body and a transverse support bar connected to the storage body and supporting the storage body; the storage body is located between the face board, the vertical support bar, the back board, and the side board; one end of the transverse support bar is detachably connected to the vertical support bar, whereas the other end is detachably connected to the side board; the back cushion is configured on the back board; the seat cushion is placed between the vertical support bar and the transverse support bar, and covers the storage unit.

Comparing to the prior art, the present invention has the following benefits:

In the sofa frame of the present invention, the two side boards, the face board and the back board form a detachable frame structure to facilitate disassembly, packing, transportation and assembly. Moreover, the vertical support bar is connected between the face board and the back board to enhance the stability of the sofa frame and reduce risk of falling-apart, and also to support the cushion. The rear side of the vertical support bar is fixed with a connecting piece that extends upward. The connecting piece is fixed and connected with the back board through screws to strengthen the support of the back board, enhance the assembly stability of the back board, and improve the anti-breakage performance of the back board. Thus, the back board may not easily break and fall off from the frame, and the risk of falling-apart can be reduced. In addition, the support leg at the lower end of the vertical support bar is used to contact the ground, and to support the middle part of the sofa frame, thus increasing bearing capacity, avoiding collapse, and extending the service life of the overall sofa frame.

DETAILED DESCRIPTION OF THE INVENTION

Depicted in FIG. 1 through FIG. 6 is a sofa frame according to the invention.

Figure 1:
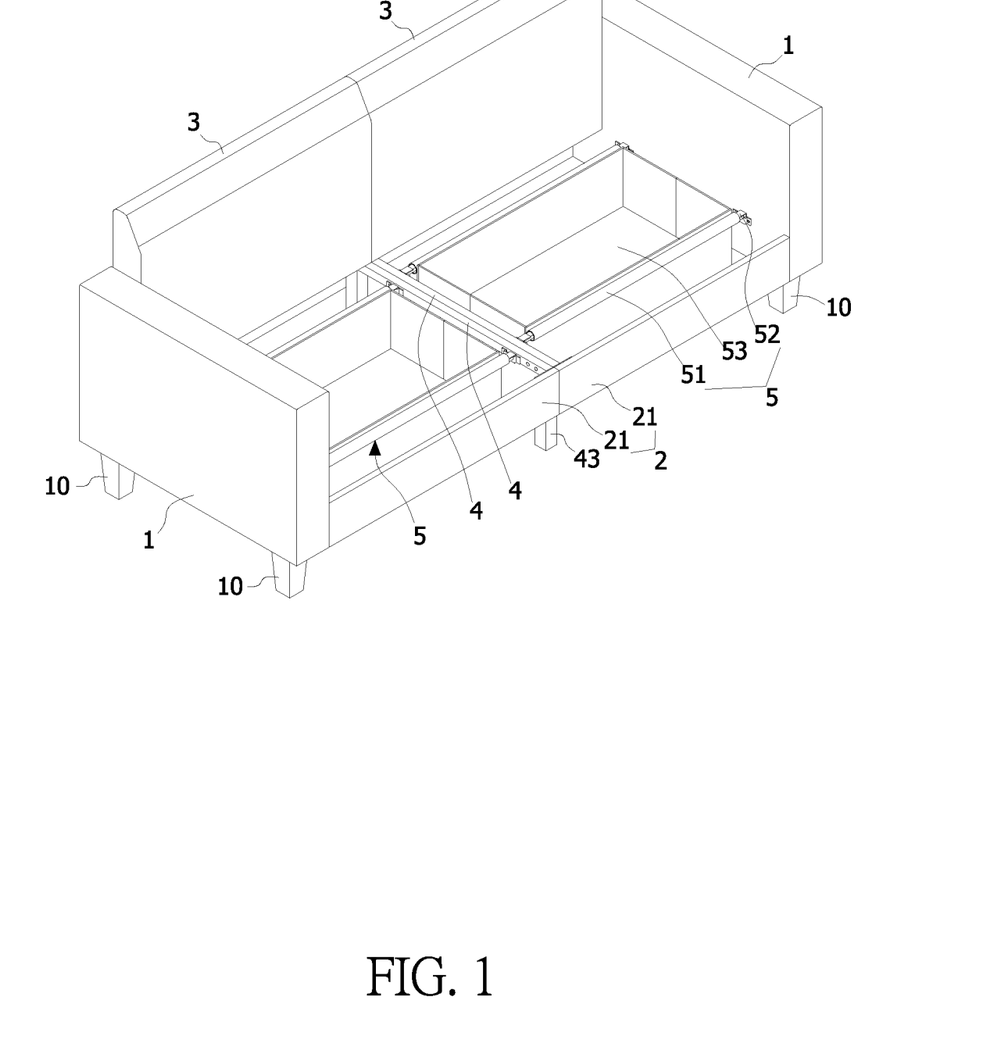
FIG. 1 is a perspective view of the sofa frame of the invention.
Figure 2:
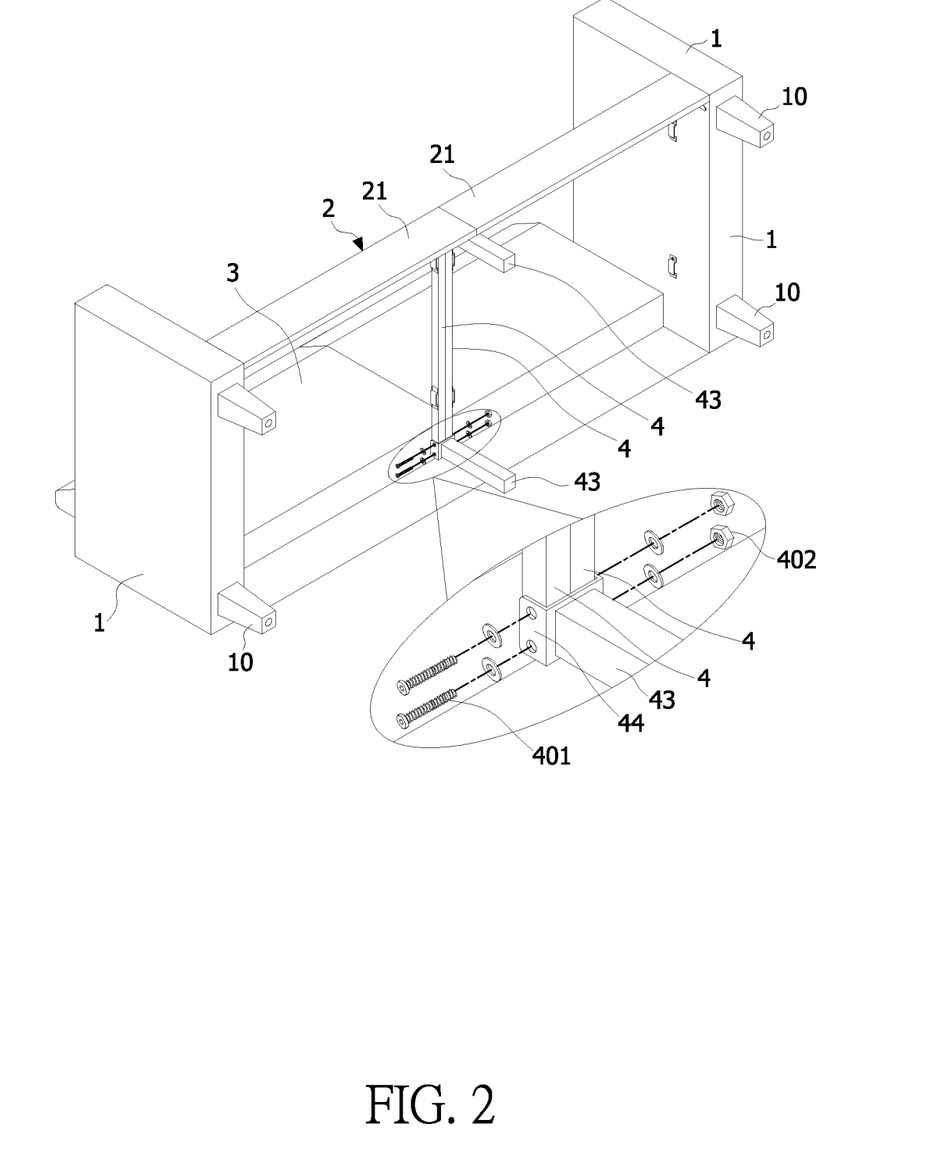
FIG. 2 is a perspective view from another angle of the sofa frame without installing the storage unit.
Figure 3:
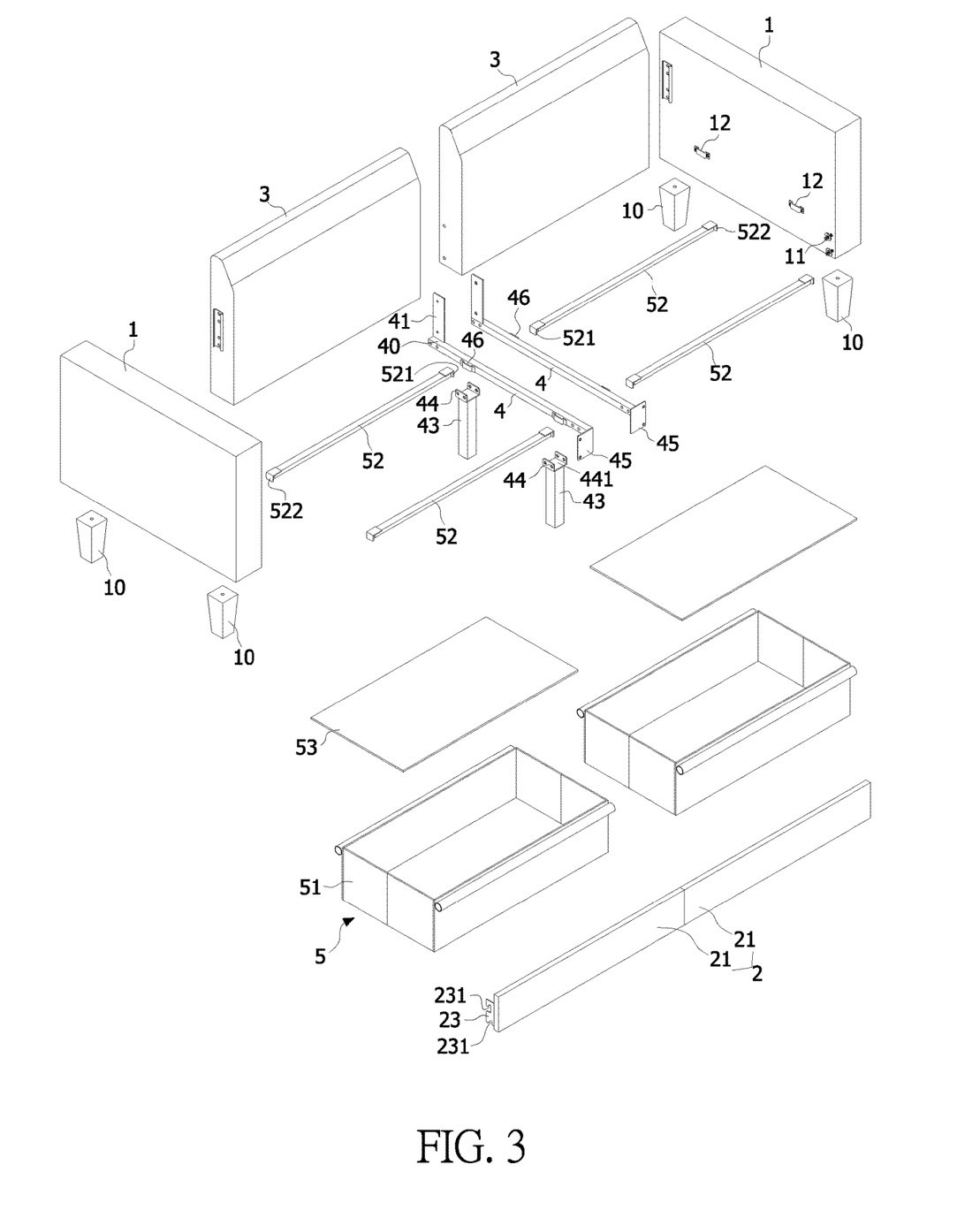
FIG. 3 is an exploded perspective view of the sofa frame.

Referring to FIGS. 1-3, the sofa frame includes two side boards 1, a face board 2 and two back boards 3, wherein the face board 2 is connected between the front ends of the two side boards 1, and the two back boards 3 are mounted side by side and connected between the rear ends of the two side boards 1, the two side boards 1, the face board 2 and the back board 3 forming a detachable frame structure. The face board 2 is used to block and protect the front part of the sofa frame. The back board 3 is provided to support the back of the user. The side boards 1 are used to provide lateral blocking and support.

The sofa frame also includes: two support legs 10 connected to the bottom of the side boards 1, the support legs 10 being detachably connected to the bottom of the side boards 1 through screws.

Two side boards 1 means two pieces of side boards.

Between the face board 2 and the back board 3, a vertical support bar 4 is connected. The vertical support bar 4 can help enhancing the stability of the whole sofa frame and reducing the risk of falling-apart. It can also provide support to the seat cushion to increase the capacity to bear the weight of the user.

The structure of the vertical support bar 4 is further detailed below.

Figure 4:
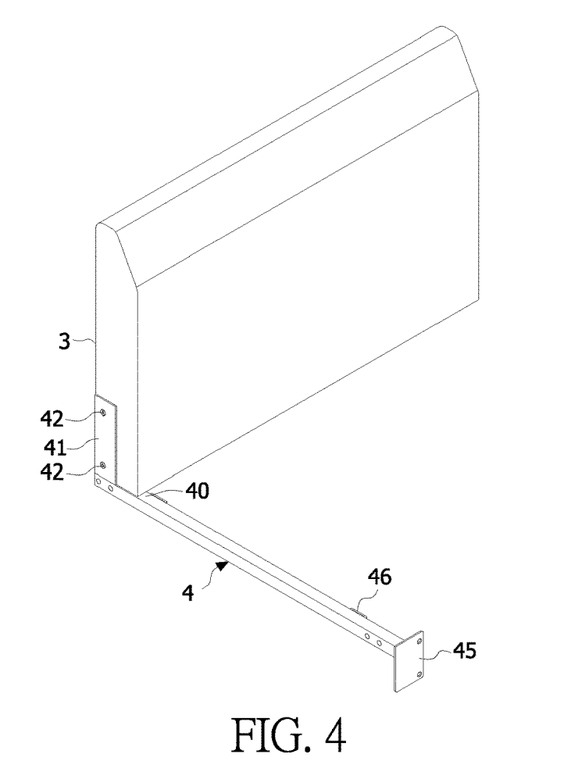
FIG. 4 is a perspective view of the vertical support bar and the side board.
Figure 5:
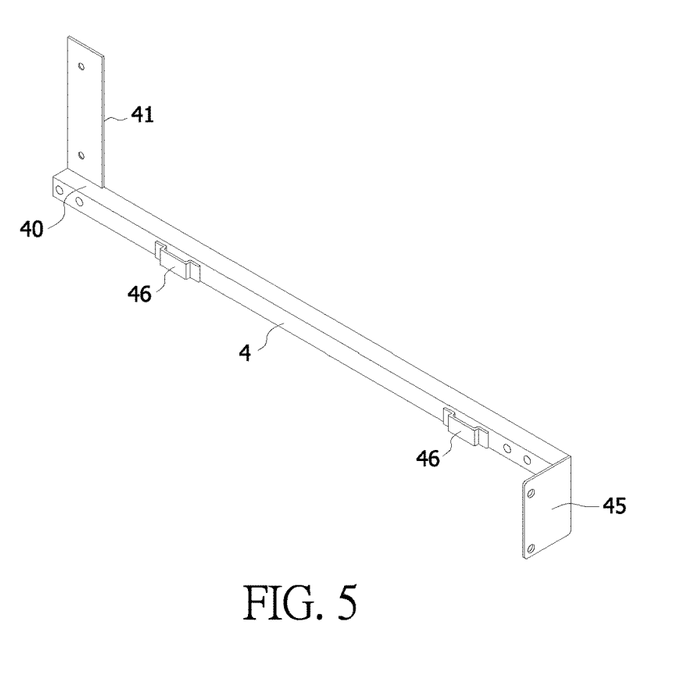
FIG. 5 is a perspective view of the vertical support bar.
Figure 6:
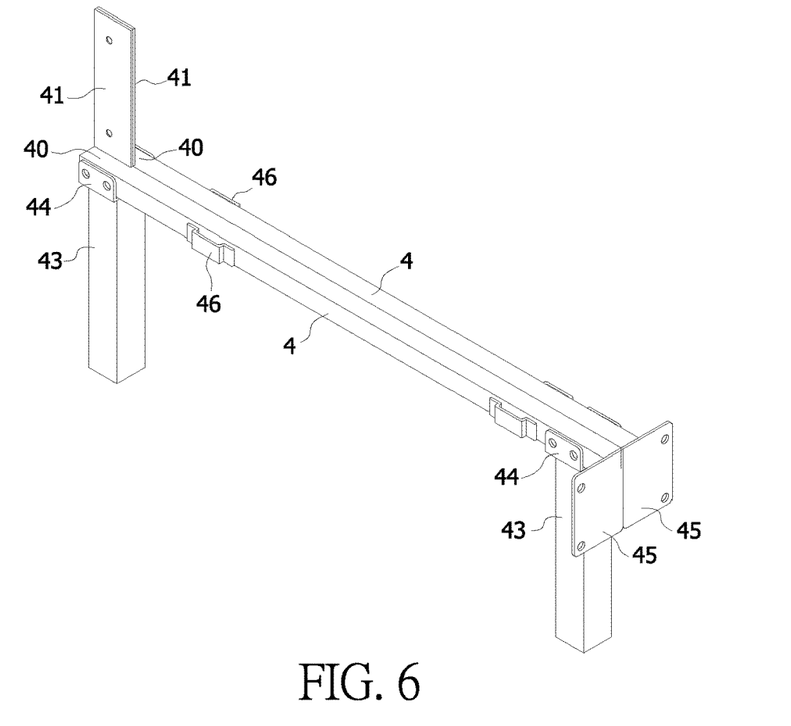
FIG. 6 is an assembled view of the two vertical support bars and the support legs.

Referring to FIGS. 4-6, the rear side of the vertical support bar 4 is fixed with a connecting piece that extends upward or downward 41. The connecting piece 41 and the back board 3 are fixed and connected to strengthen the support of the back board 3, thus enhancing the anti-breakage performance of the back board 3, improving the stability, avoiding breakage and falling-off from the sofa frame, and reducing the risk of falling-apart of the whole frame.

The connecting pieces 41 are in the shape of a plate, and are fixed and connected with the back board 3 through screws 42. Or, the back board 3 is configured with a plug board (not shown), and the outer side of the plug board is configured with a vertically arranged slot (not shown). During assembly, the connecting piece 41 is inserted into the slot of the plug board, so that they are fixed and connected to form a tight assembly.

The connecting piece 41 is fixed on the upper end of the rear side of the vertical support bar 4, extending upward. After it is fixed and connected with the back board 3, it can coordinate with the vertical support bar 4 to improve the stability of support to the back board 3.

The vertical support bar 4 and connecting piece 41 are both metal components. The vertical support bar 4 is a square bar, providing very good support.

The connecting piece 41 and the vertical support bar 4 are fixed integrally to form an L-shaped structure. They can also be fixed integrally through welding to provide better stability and higher strength.

The connecting piece 41 is fixed on one side of the upper end of the rear side of the vertical support bar 4, so that the upper end of the vertical support bar 4 forms a support surface 40. Thus, during assembly of the vertical support bar 4 and the back board 3, the lower end face of the back board 3 is also supported on the support surface 40. The connecting pieces 41 are fixed on the side face of the back board 3, and is further locked through screws 42, so that the vertical support bar 4 is stably connected to the connecting pieces 41 and the back board 3 to form a stable structure to enhance the overall structural strength of the sofa frame.

Referring to FIG. 6, the lower end of the vertical support bar 4 is configured with at least one support leg 43 that contacts the ground to support the middle of the sofa frame, thus improving the bearing capability, avoiding collapse due to insufficient bearing capacity of the middle part of the sofa frame, and extending the service life.

Referring to FIGS. 3-6, there are two vertical support bars 4, symmetrically arranged side by side; each vertical support bar 4 is connected to a back board 3, so that the two back boards 3 are respectively supported by two vertical support bars 4. Thus, the assembly stability of the back board 3 is enhanced.

The structures of the two vertical support bars 4 are slightly different. Firstly, referring to FIG. 4, the structure of the first vertical support bar 4 is as follows: the connecting piece 41 is fixed on the left side of the upper end of the rear side of the vertical support bar 4, and the fastening board 45 is fixed on the right side of the front end of the vertical support bar 4; Referring to FIG. 5, the structure of the second vertical support bar 4 is as follows: the connecting piece 41 is fixed on the right side of the upper end of the rear side of the vertical support bar 4, and the fastening board 45 is fixed on the left side of the front end of the vertical support bar 4.

Referring collectively to FIGS. 0.3 and 6, the upper end of the support leg 43 is fixed with a U-shaped lock seat 44, and the U-shaped lock seat 44 tightly clamps the two vertical support bars 4, and they can be locked up through fastening components.

The upper end of the U-shaped lock seat 44 has a clamping slot 441. The two vertical support bars 4 are mounted inside the clamping slot 441, being limited and tightly clamped. Referring to FIG. 2, the fastening component includes a bolt 401 and a nut 402 that matches the bolt 401. The bolt 401 goes through the U-shaped lock seat 44 and the two vertical support bars 4 and is spirally fixed with the nut 402, so that the two vertical support bars 4 and the U-shaped lock seat 44 are locked and connected to form a stable structure to strengthen the two parallel vertical support bars 4 to provide stronger bearing capacity.

Between the vertical support bar 4 and the side boards 1, there is a storage unit 5. The storage unit 5 includes: a storage body 51 and transverse support bars 52 connected to the storage body 51 and supporting the storage body 51. The storage body 51 is located between the face board 2, the vertical support bar 4, the back board 3, and the side boards 1. One end of the transverse support bar 52 is detachably connected to the vertical support bar 4, whereas the other end is detachably connected to the side board 1.

The above-mentioned vertical support bar 4 and the transverse support bar 52 inside the storage unit 5 form a multi-functional support structure, which, on the one hand, can provide support to the weight of the seat cushion and the user, on the other hand, can coordinate with the side boards 1 to carry the storage body 51 of the storage unit 5. The introduction of the storage body can help enhance the competitiveness of the product. Moreover, the two ends of the transverse support bar 52 are both connected in a detachable form to facilitate the convenience of disassembly.

Figure 7:
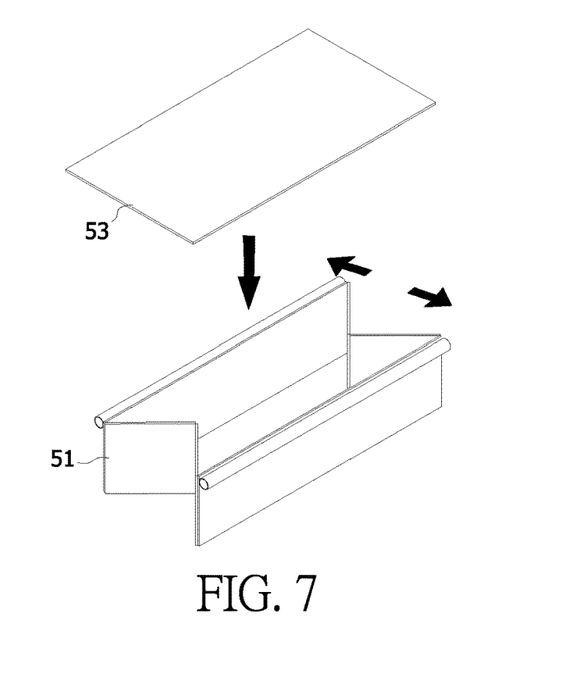
FIG. 7 shows one embodiment of the storage unit of the invention.
Figure 8:
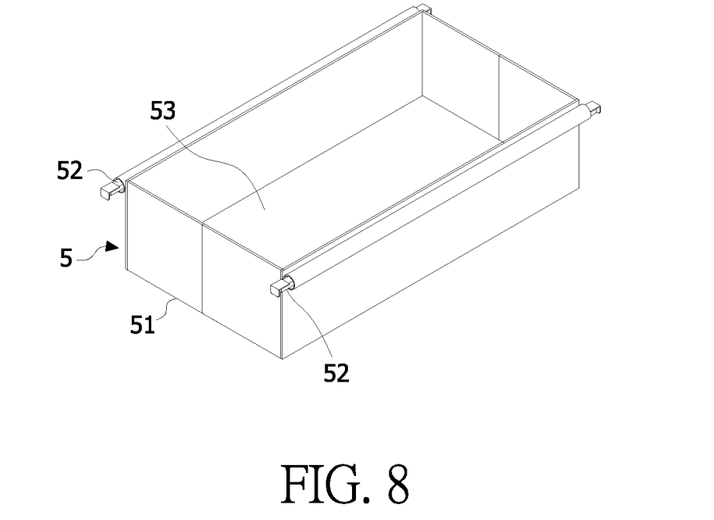
FIG. 8 is a perspective view of the storage unit.

Being a foldable structure, the storage body 51 can save space during transportation and reduce the cost of transportation. As shown in FIGS. 7 and 8, the storage body 51 can be folded by pushing toward the middle line or opened by pulling toward the front and rear ends. In addition, the storage body 51 can be a soft storage bag like a canvas bag or a mesh bag.

The storage body 51 is configured with a detachable base board 53. The base board 53 can push open the storage body 51, so that the inside of the storage body 51 forms a storage chamber. When the base board 53 is a rigid board, it can not only provide stable support, but also satisfy the need of convenient transportation.

Referring to FIG. 8, the transverse support bars 52 of the invention are mounted on the storage body 51 in a sleeving manner. The two ends of the storage body 51 are respectively configured with a through hole. The two transverse support bars 52 respectively go through one through hole, so that the two ends of the storage body 51 are respectively sleeved with one transverse support bar 52 that can be easily disassembled. This is good for convenient transportation and storage.

In the present invention, there can be multiple means for the detachable connection of the transverse support bar 52 with the vertical support bar 4 and the side boards 1.

For example, referring to FIGS. 3-6, the outer side of the vertical support bar 4 is fixed with a first socket component 46, whereas the inner side of the side boards 1 is fixed with a second socket component 12; the two ends of the transverse support bar 52 are respectively fixed with a first plug component 521 and a second plug component 522, and the first plug component 521 and the second plug component 522 are respectively inserted into the first socket component 46 and the second socket component 12. Through the matching socket component and plug component, the parts can be quickly assembled and disassembled to facilitate easy and efficient operation.

Another example is that, the two ends of the transverse support bar 52 can respectively be detachably connected to the vertical support bar 4 and the side boards 1 through screws. The two ends of the transverse support bar 52 are both integrally fixed with a connecting board (not shown). The connecting board is configured with a hole (not shown). The two pieces of connecting boards can be respectively connected with the vertical support bar 4 and the side board 1, and screws can be used to go through the holes of the connecting board, the vertical support bar 4, and the side board 1 for spiral connection, so that the vertical support bar 4, the transverse support bar 52, and the side board 1 are fastened together to form a detachably connected structure.

A further example is that, the two ends of the transverse support bar 52 are respectively configured with a threaded rod (not shown). The threaded rod can be screwed into the threaded holes configured on the vertical support bar 4 and the side boards 1 (not shown) to form a detachably connected structure.

Figure 9:
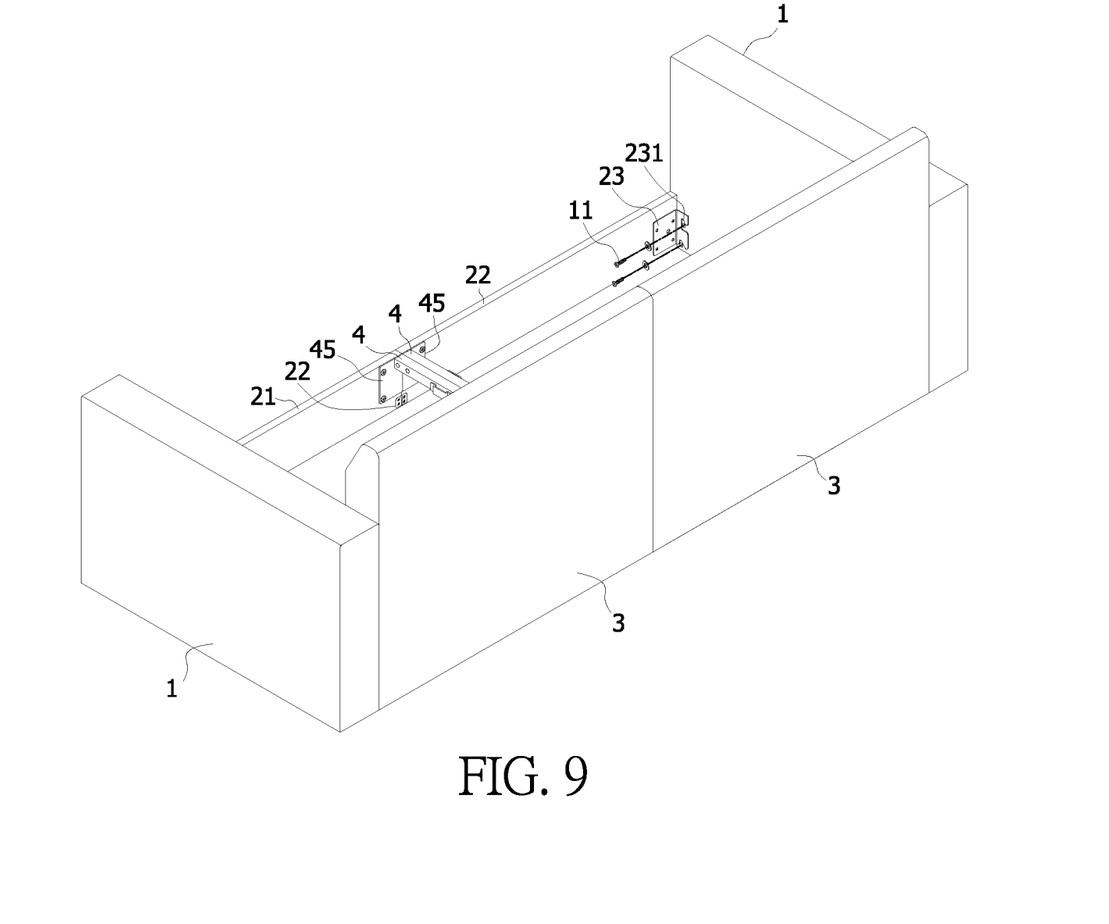
FIG. 9 is another perspective view of the sofa frame without installing a storage unit.

Referring collectively to FIGS. 3 and 9, the face board 2 includes at least two boards 21, and the two boards 21 are connected through articulation pieces 22, so that they can be folded through the articulation pieces 22 to form a foldable structure, thus reducing the length and space occupation, and consequently reducing cost or transportation. The articulation pieces 22 are hinges as conventional metal components.

The front end of the vertical support bar 4 is fixed with a fastening board 45. Through screws, the fastening board 45 locks up the two neighboring boards 21 to form a detachable structure. After locking and joining of the vertical support bar 4 and the two boards 21, the face board 2 is in the shape of a straight bar, forming a stable support to avoid accidental falling-off.

The design of the face board 2 is not limited to the foldable structure in multiple sections as disclosed in the present embodiment, it can also be a detachable structure in multiple sections, i.e., the neighboring sections of the face board 2 are connected by means of plug or screw. The multi-sectional detachable or foldable face board 2 can provide convenience in transportation.

Referring to FIG. 9, the end portion of the face board 2 is configured with a right-angle connecting piece 23. One end of the right-angle connecting piece 23 is configured with an L-shaped quick disassembly lock hole 231; the inner side of the side board 1 is configured with a fastening bolt 11. Through the L-shaped quick disassembly lock hole 231, the right-angle connecting piece 23 is sleeved onto the fastening bolt 11. By tightening the fastening bolt 11, the right-angle connecting piece 23 is fixed on the inner side of the side board 1. Such an assembly structure is very easy and can be disassembled conveniently.

Figure 10:
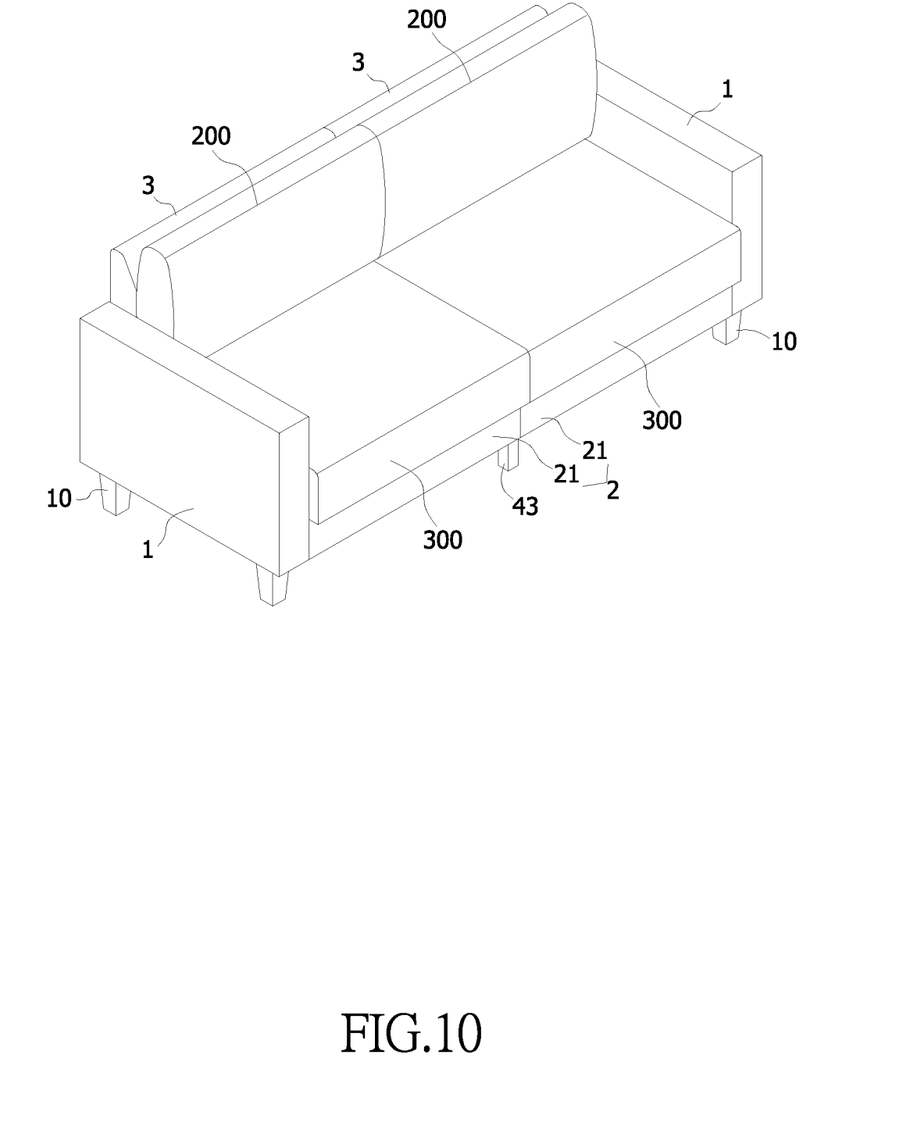
FIG. 10 is a perspective view of the assembled sofa of the invention.

Depicted in FIG. 10 is an assembled sofa, which includes the sofa frame, a back cushion 200, and a seat cushion 300. The back cushion 200 is attached to the back board 3; the seat cushion 300 is placed between the vertical support bar 4 and the transverse support bars 52, and the seat cushion 300 covers the storage unit 5. The sofa frame has been described above in detailed and is not further described here. When storage is required, just remove the seat cushion 300 and put articles into the storage unit 5. Then put the seat cushion 300 back on the storage unit 5 to hide the storage unit 5.

I claim:

1. A sofa frame, including two side boards, a face board connected between the front ends of the two side boards and a back board connected between the rear ends of the two side boards, the two side boards, the face board and the back board form a detachable frame structure, characterized in that:
   between the face board and back board, a vertical support bar is connected, the rear end of the vertical support bar is fixed with a connecting piece that extends upward or downward, by fixing and connecting the connecting piece and the back board, the support of the back board can be strengthened, the lower end of the vertical support bar is configured with at least one support leg to contact the ground;
   wherein the connecting piece and vertical support bar are fixed integrally to form an L-shaped structure; the connecting piece is fixed on the upper end of the rear side of the vertical support bar, so that the upper end of the vertical support bar forms a support surface, the lower end face of the back board is further supported on the support surface.

2. The sofa frame defined in claim 1, wherein there are two vertical support bars, symmetrically arranged side by side; the upper end of the support leg is fixed with a U-shaped lock seat, the U-shaped lock seat tightly clamps the two vertical support bars, and they are locked together through a fastening component.

3. The sofa frame defined in claim 1, wherein there is a storage unit between the vertical support bar and the side board; the storage unit includes: a storage body and a transverse support bar connected to the storage body and supporting the storage body; the storage body is located between the face board, the vertical support bar, the back board, and the side board; one end of the transverse support bar is detachably connected to the vertical support bar, whereas the other end is detachably connected to the side board.

4. The sofa frame defined in claim 3, the storage body is a folding structure, and the storage body is configured with a detachable base board, and the storage body is pushed open by the base board, so that the inside of the storage body forms a storage chamber.

5. The sofa frame defined in claim 3, the outer side of the vertical support bar is fixed with a first socket component, the inner side of the side board is fixed with a second socket component; the two ends of the transverse support bar are respectively fixed with a first plug component and a second plug component, and the first plug component and the second plug component are respectively inserted into the first socket component and the second socket component, so that the vertical support bar, the transverse support bar and the side board are fastened together, to form a detachably connected structure; or, both ends of the transverse support bar are integrally fixed with a connecting board, the connecting board is configured with a hole; the two connecting boards are respectively connected to the vertical support bar and the side board, and screws go through the holes of the connecting board to spirally lock it with the vertical support bar and the side board, so that the vertical support, bar, the transverse support bar and the side board are fastened together to form a detachably connected structure; or, the two ends of the transverse support bar are configured with threaded sections, and through the threaded sections, and the threaded holes configured on the vertical support bar and the side board, they can be spirally fixed together to form a detachably connected structure.

6. The sofa frame defined in claim 3, wherein the face board includes at least two boards, two neighboring boards are connected through articulation pieces, so that the two neighboring boards can be folded through the articulation pieces; the front end of the vertical support bar is fixed with a fastening board, the fastening board locks up the two neighboring boards through screws to form a detachable structure.

7. The sofa frame defined in claim 6, wherein the end part of the face board is configured with a right-angle connecting piece, one side of the right-angle connecting piece is configured with an L-shaped quick disassembly lock hole; the inner side of the side board is configured with a fastening bolt, the right-angle connecting piece is sleeved on the fastening bolt through an L-shaped quick disassembly lock hole, the fastening bolt is tightened to fix the right-angle connecting piece on the inner side of the side board.

8. A vertical support bar, the rear side of the vertical support bar being fixed with a connecting piece that extends upward, the connecting piece and the back board being fixed and connected to strengthen the support of the back board, and the lower end of the vertical support bar being configured with at least one support leg to contact the ground;
   wherein the connecting piece and the vertical support bar are fixed integrally to form an L-shaped structure; the connecting piece is fixed on the upper end of the rear side of the vertical support bar, so that the upper end of the vertical support bar forms a support surface, the lower end face of the back board is further supported on the support surface.

9. The vertical support bar defined in claim 8, wherein the number of the vertical support bars is two, arranged symmetrically; the upper end of the support leg is fixed with a U-shaped lock seat, the U-shaped lock seat tightly clamps the two vertical support bars, and they are locked together through a fastening component.

10. An assembled sofa, which includes a sofa frame, a back cushion and a seat cushion as defined in claim 1; there is a storage unit between the vertical support bar and the side board; the storage unit includes: a storage body and a transverse support bar connected to the storage body and supporting the storage body; the storage body is located between the face board, the vertical support bar, the back board, and the side board; one end of the transverse support bar is detachably connected to the vertical support bar, whereas the other end is detachably connected to the side board; the back cushion is configured on the back board; the seat cushion is placed between the vertical support bar and the transverse support bar, and covers the storage unit.

\* \* \* \* \*